(12) United States Patent
Sanai

(10) Patent No.: US 6,694,371 B1
(45) Date of Patent: Feb. 17, 2004

(54) COMMUNICATION INTERFACE DEVICE AND METHOD

(75) Inventor: Daiji Sanai, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/144,520

(22) Filed: Aug. 31, 1998

(30) Foreign Application Priority Data

Sep. 1, 1997 (JP) ............................................. 9-236037

(51) Int. Cl.[7] .............................................. G06F 15/16
(52) U.S. Cl. ........................ 709/230; 709/203; 709/238; 709/239
(58) Field of Search .............................. 709/200.6, 239, 709/203, 238, 303, 230; 707/501, 513; 714/57; 370/552, 355; 715/501.1, 513

(56) References Cited

U.S. PATENT DOCUMENTS

| | | | | |
|---|---|---|---|---|
| 5,647,056 A | * | 7/1997 | Barrett et al. | 333/24 R |
| 5,732,213 A | * | 3/1998 | Gessel et al. | 709/224 |
| 5,935,212 A | * | 8/1999 | Kalajan et al. | 709/228 |
| 6,025,931 A | * | 2/2000 | Bloomfield | 358/402 |
| 6,098,108 A | * | 8/2000 | Sridhar et al. | 709/239 |
| 6,115,040 A | * | 9/2000 | Bladow et al. | 345/335 |
| 6,243,838 B1 | * | 6/2001 | Liu et al. | 714/57 |
| 6,335,928 B1 | * | 1/2002 | Herrmann et al. | 370/352 |

OTHER PUBLICATIONS

Kawai, Yasuhiro, *Nikkei Internet Technology*, pp. 80–103 (Jul. 27, 1997).
Mineo, Jun'ichi, *IPSJ SIG Notes*, vol. 96, No. 40, pp. 115–120 (May 17, 1996).

* cited by examiner

*Primary Examiner*—Frantz B. Jean
(74) *Attorney, Agent, or Firm*—Rohm & Monsanto, PLC

(57) ABSTRACT

A communication interface device connects communication object machines to communication networks that interconnect the communication object machines and management devices that operate or monitor the communication object machines. The communication interface device includes a socket server for converting signals between the communication object machines and the communication networks. A WWW server is connected to the communication networks, and a memory is connected to the WWW server. The memory stores application programs to be transferred to the management devices via the communication networks according to client programs stored in the management devices for execution on the client programs.

13 Claims, 6 Drawing Sheets

COMMUNICATION INTERFACE DEVICE AND METHOD

BACKGROUND OF THE INVENTION

1. Field of the Invention

This invention relates to communication interface devices and methods, for use in network systems, and more particularly, to devices and methods for operating or monitoring a communication object machine or equipment such as a process controller via a communication network by an information terminal or monitoring device such as a personal computer, the communication object machine or equipment having a communication processing function.

2. Description of the Related Art

Along with improvements to the Internet network environment, there has been proposed a system that utilizes a communication infrastructure in the field of automation, such as a process controller or a building management system. According to the known system, facilities are managed using a general-purpose operating system without preparation of any special network environments and without any dedicated wiring facilities. Also, the cost for constructing the system is low.

An interface device is used for conversion of signals such as data, instruction or the like between a serial communication (RS232C) generally used for the communication object machines and a communication protocol (TCP/IP) for the management device or apparatus (e.g., personal computer) having an internet browser. Hereinafter, the meaning of "device" includes "apparatus" and the like. Such an interface device includes a dedicated driver for communicating serially with the communication object machine, a WWW server for connecting with the TCP/IP network of the management devices, and a common gateway interface (CGI) accompanying the WWW server. The CGI stores programs for controlling transmission of signals between the dedicated driver and the CGI.

The CGI is an interface that enables the WWW server not only to present or transmit a file such as an HTML document in response to a demand from the internet browser of the management device, but also to start a particular program in response to the demand from the browser and to present the results to the browser.

In the conventional interface device, however, it is necessary to provide a dedicated driver for effecting the serial communication with the communication object machine, as mentioned above. In addition, it is necessary to prepare a communication procedure or a communication program for activating the program on the WWW server in response to an input from the driver for each of the object machines and to incorporate the communication procedure or program into the driver and the CGI. Therefore, the interface device is required to have a special CPU or a memory having large capacity, resulting in high cost. Also, the program prepared for each machine cannot be used for general purposes.

SUMMARY OF THE INVENTION

It is an object of the invention to provide a communication interface device having a simple arrangement that is useful as an interface between a communication object machine such as a process controller and an internet, in which a signal from the communication object machine is directly treated on the internet web (WWW).

It is another object of the invention to provide a general-purpose communication interface device that does not require preparation of a communication program for each of the object machines.

It is another object of the invention to store various different communication programs in each of the object machines in the interface device connected with the object machine or in the object machine itself, thereby making a communication procedure to be an object and removing the necessity of holding the various communication programs in the management device.

It is another object of this invention to provide a communication method for realizing an interface facility between a communication object machine and an internet by a simple structure, and for making the interface useful for general purposes.

The foregoing and other objects are achieved by the following invention.

The invention provides a communication interface device for connecting a communication object machine with a communication network existing between the communication object machine and a management device for operating the machine or monitoring action of the machine, which includes a socket server for converting signals between the machine and the communication network, a WWW server to be connected to the communication network, and a memory connected to the WWW server. The memory stores an application program to be transferred to the management device via the communication network according to a client program prepared in the management device and to be executed on the client program.

The client program used for the invention is typically an internet browser, but is not limited to this. It can be used with other software such as an HTTP client program to acquire HTML files from a WWW server.

The application program can be a general-purpose program, for example, "JAVA applet", "JAVA Beans", "Active X" (a trademark) and so on. The "JAVA applet" is a program (application module) described with the JAVA language and can be carried on a browser (HTML). The "JAVA Beans" is a part (component module) of the JAVA application described with JAVA. Both of them can be served from a server via the network. The "Active X" is not JAVA, but a component module which can be served via the network.

In this invention, while the socket server converts the signals between the communication object machine and the communication network, the memory connected to the WWW server stores the application program that is delivered according to the client program of the management device and executed on the client program. Therefore, when the WWW server is accessed by the client program of the management device, the information demanded is supplied to the management device from the WWW server via the communication network, and also the application program is executed on the client program of the management device. That is, the application program is incorporated into the client program via the WWW server and is executed. Consequently, a communication between the object-machine and the management device is performed via the socket server.

According to this invention, since the application program is executed on the client program such as internet browsers of the management device side and a communication between the communication object machine and the management device is performed via the socket server, a dedicated driver or program required for the conventional communication interface devices becomes unnecessary, so that the interface device can be constructed simply and at low cost.

Further, since the, operating condition of the application program depends on the performance of the management device, the relative diminution of functionality is avoided such that processing speed of the interface device decreases relatively accompanied with increment in processing speed of the peripheral equipment in a process or the like.

In addition, the interface device can function with various kinds of object machines by merely changing or replacing the application program corresponding to the object machine. Consequently, the interface device has broader applicability than conventional interface devices.

In an embodiment of the communication interface device of this invention, the application program and the HTML document, or other information, can be stored in the memory.

In another embodiment, the application program is a general-purpose program such as "JAVA applet" or the like that functions on the internet web (WWW). The management device accesses the interface device to select the application program and execute same on the client program of the management device. Then, the control or monitor of the object machine can be processed by establishing the connection between the management device and the object machine. In this way, since a signal for the communication object machine can be treated directly through the internet by utilizing a program workable on the internet web, the arrangement of the interface device for connection between the internet and the object machine can be compact.

When the JAVA applet is used, the user can be specified and his or her identity can be maintained in secrecy due to the security capability of the JAVA applet. It is suitable for management of the object machines.

In another embodiment, the signal conversion includes a mutual conversion of a communication protocol effective between the communication object machine and the communication network and a communication protocol effective between the socket server and the communication network.

The present invention also provides a communication object machine that functions to communicate with a management device via a communication network, which includes a socket server for converting signals between the communication object machine and the communication network, a WWW server to be connected to the communication network, and a memory connected to the WWW server communication object machine. The memory stores an application program to be transferred to the management device via the communication network according to a client program prepared in the management device and to be executed on the client program.

According to the communication object machine of the invention, it is not necessary to provide a unit for interface, and the communication object machine itself can establish a connection with the management device and execute handling such as setting parameter or monitoring the object machine from the management device.

The present invention also provides a communication method for communicating between a communication object machine and a management device via a communication network existing between the machine and the management device which operates the machine or monitors actions of the machine, which includes the steps of:
  connecting the management device to a WWW server according to a client program such as an internet browser stored in the management device;
  getting an application program workable on the client program via the communication network from the WWW server;
  establishing the connection of the management device to the machine by executing the application program on the management device; and
  communicating between the management device and the machine according to the application program.

BRIEF DESCRIPTION OF THE DRAWING

The foregoing and other objects, features, and advantages of the invention will become more apparent from the following detailed description taken in conjunction with the accompanying drawing figures, in which.

DETAILED DESCRIPTION OF THE PREFERRED EMBODIMENT

Figure 1:
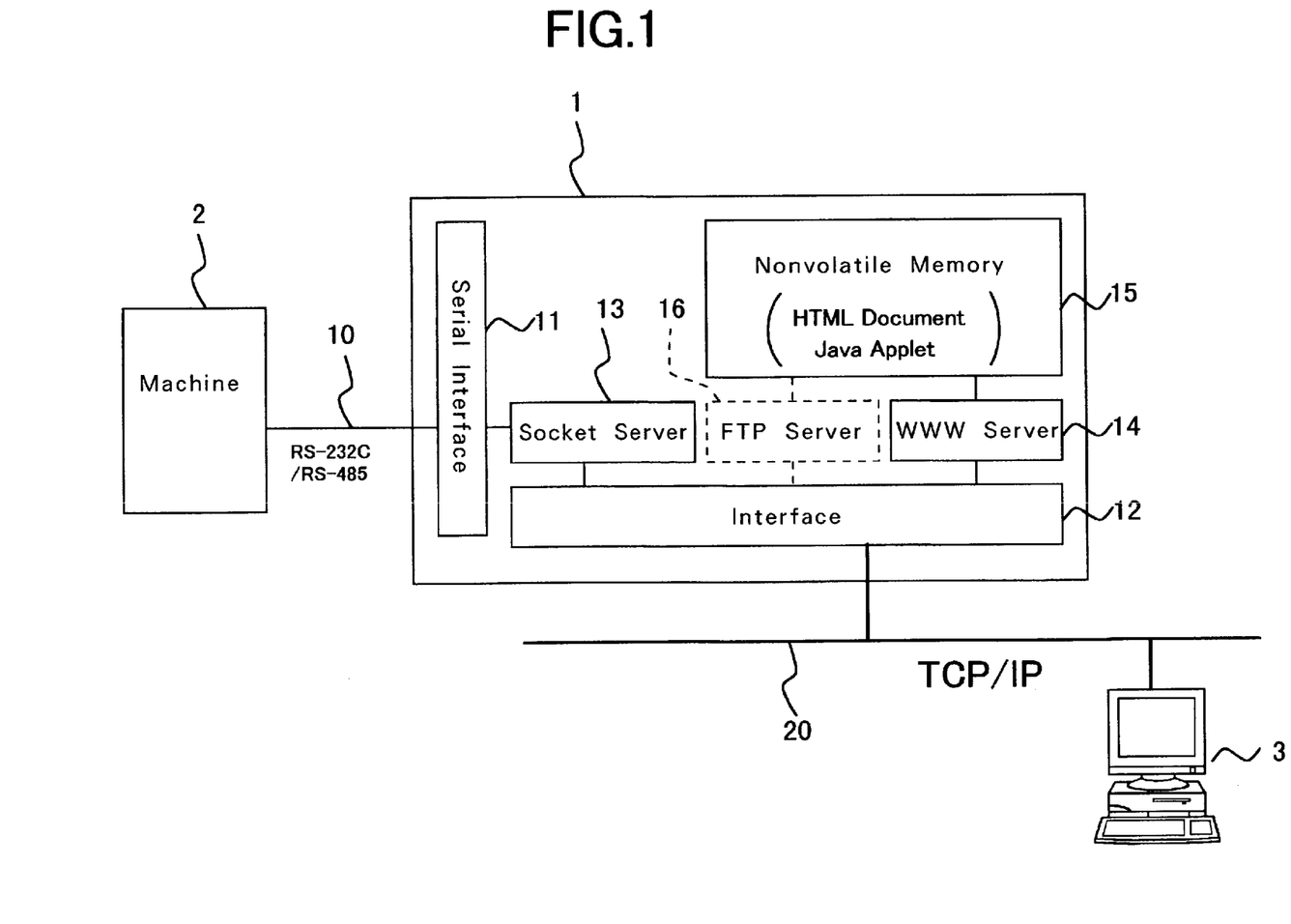
FIG. 1 is a block diagram representation of the interface device according to the invention.

Referring to FIG. 1, an interface device 1 is connected between a communication object machine 2, such as a controller for process control, and a management device, such as a personal computer 3, to operate or monitor the communication object machine 2. In the personal computer 3, an internet browser is stored as a client program. The interface device 1 includes a serial interface 11 for effecting serial communication by RS232C via a communication cable 10 with the object machine 2; an interface 12 for effecting communication by TCP/IP via a telecommunication line 20 with the personal computer 3; a socket server 13 connected to the serial interface 11 as well as the interface 12; a WWW server 14 connected to the interface 12; and a nonvolatile memory (flash ROM) 15 connected to the WWW server 14. In the memory 15, an HTML Doc (a document made by Hyper Text form) is stored as information that can be read out on the internet browser stored in the personal computer 3, in addition to an application program mentioned later. Preferably, an FTP (file transfer protocol) server 16 is provided between the interface 12 and the memory 15 for writing into the memory 15.

In the interface device 1, the socket server 13 converts signals that are transmitted between the object machine 2 and the personal computer 3. The WWW server 14 reads out the information and/or an application program stored in the memory 15 in response to a demand from the browser of the personal computer 3.

Figure 2:
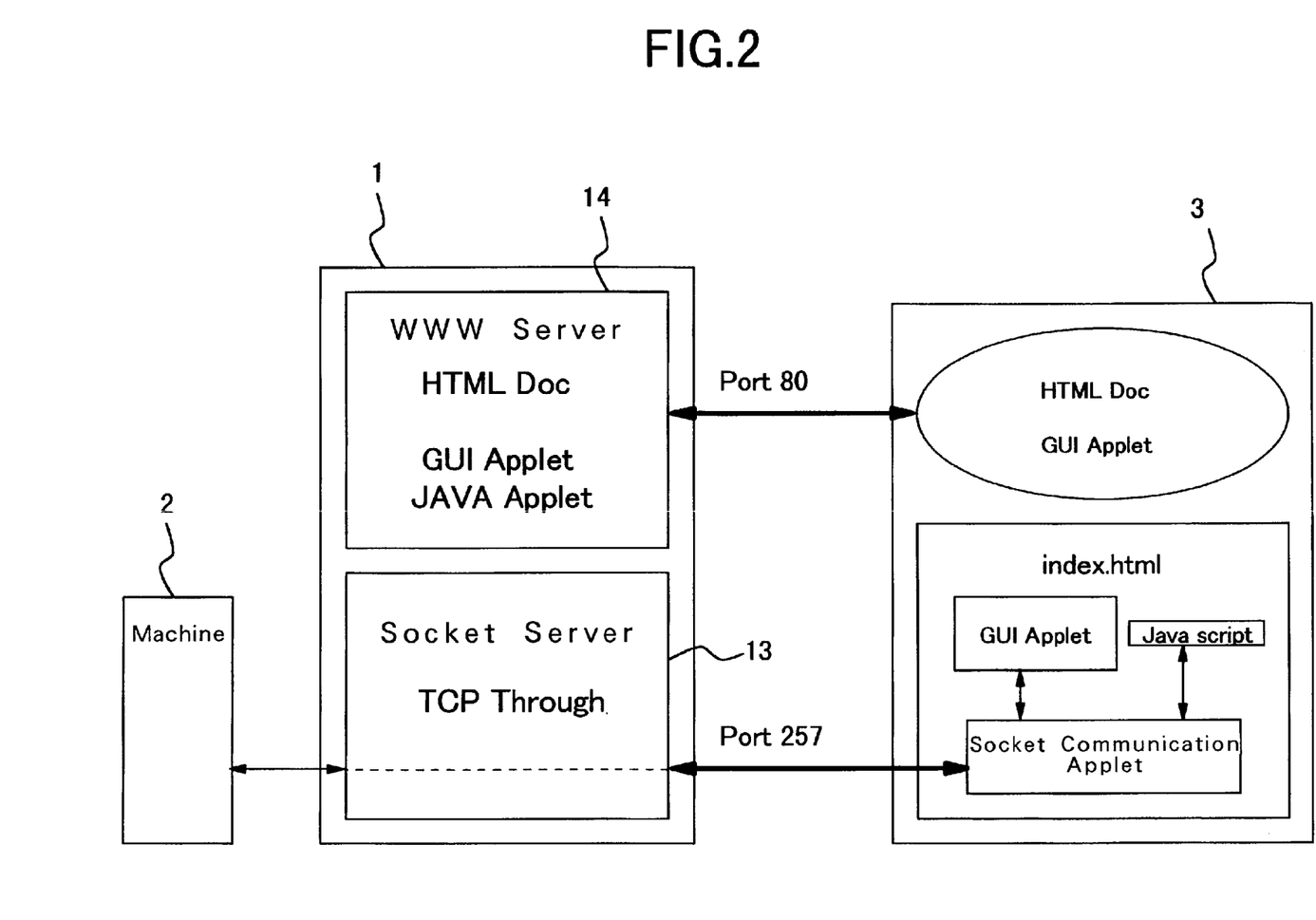
FIG. 2 is a block diagram representation of the example of information or the application program retrieved by a WWW server.

As shown in FIG. 2, a "JAVA applet", such as "socket communication JAVA applet" or "GUI (graphic user interface) JAVA applet", constitutes the information or the application program that is read out by the WWW server 14. These items of information are stored in the memory 15, read out in response to a demand from the browser of the personal computer 3, transferred via the telecommunication line 20 to the personal computer 3, and executed.

The "socket communication JAVA applet" is a JAVA applet that has the socket communication function and communicates with the object machine 2 via the socket server 13. The "GUI JAVA applet" is a JAVA applet that gives the graphic display or input of the information on a browser.

Figure 3:
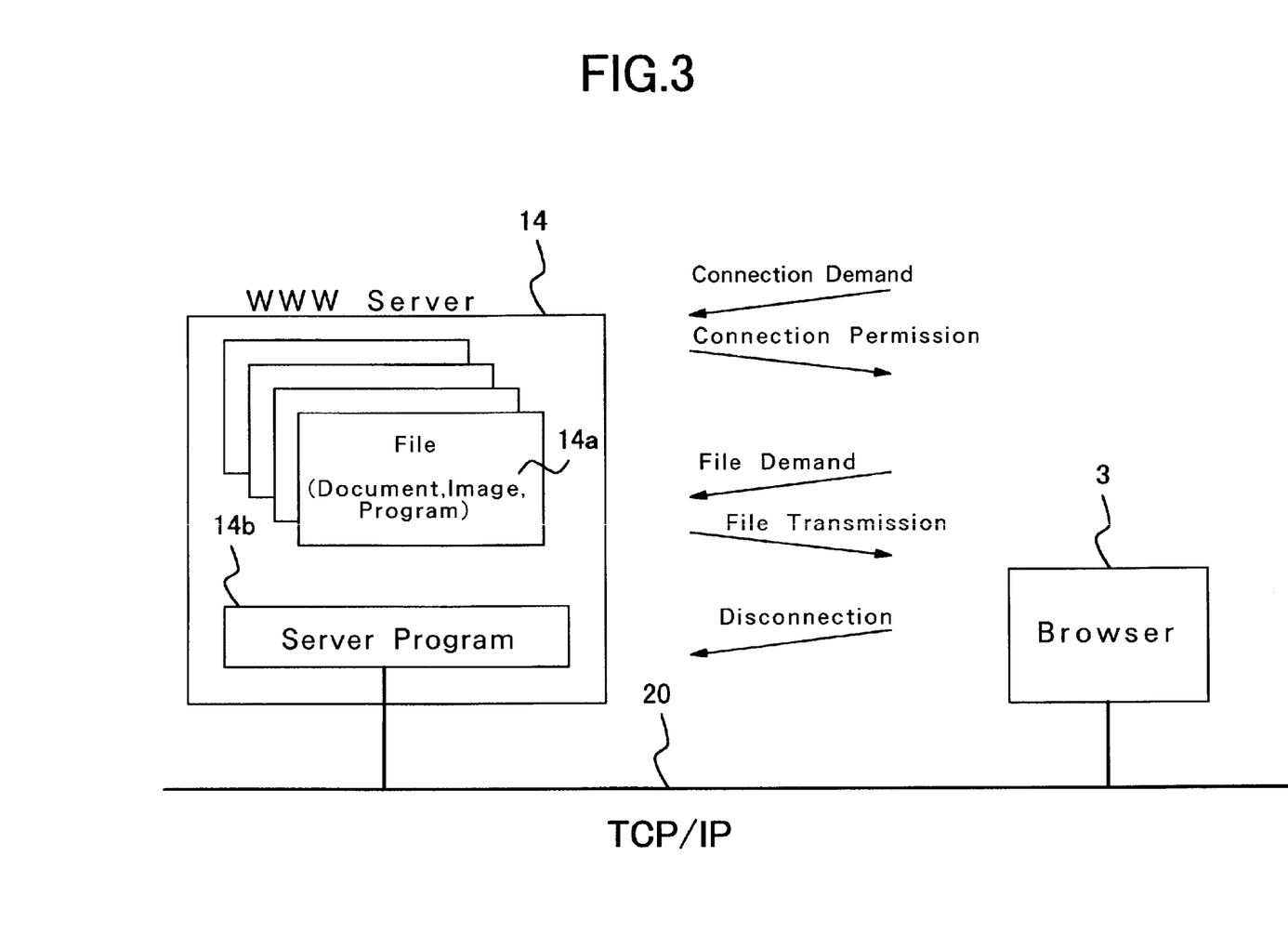
FIG. 3 is a representation of a function of the WWW server.

As shown in FIG. 3, while the WWW server 14 stores an HTML Doc and other information 14a in the memory 15, it also holds a server program 14b. According to the program, it allows (or does not allow) connection in response to a connection demand from the personal computer 3, it executes transmission of file (or answer of not permitting transmission) in response to a file demand (instruction), and it executes disconnection in response to a disconnection demand.

Figure 4:
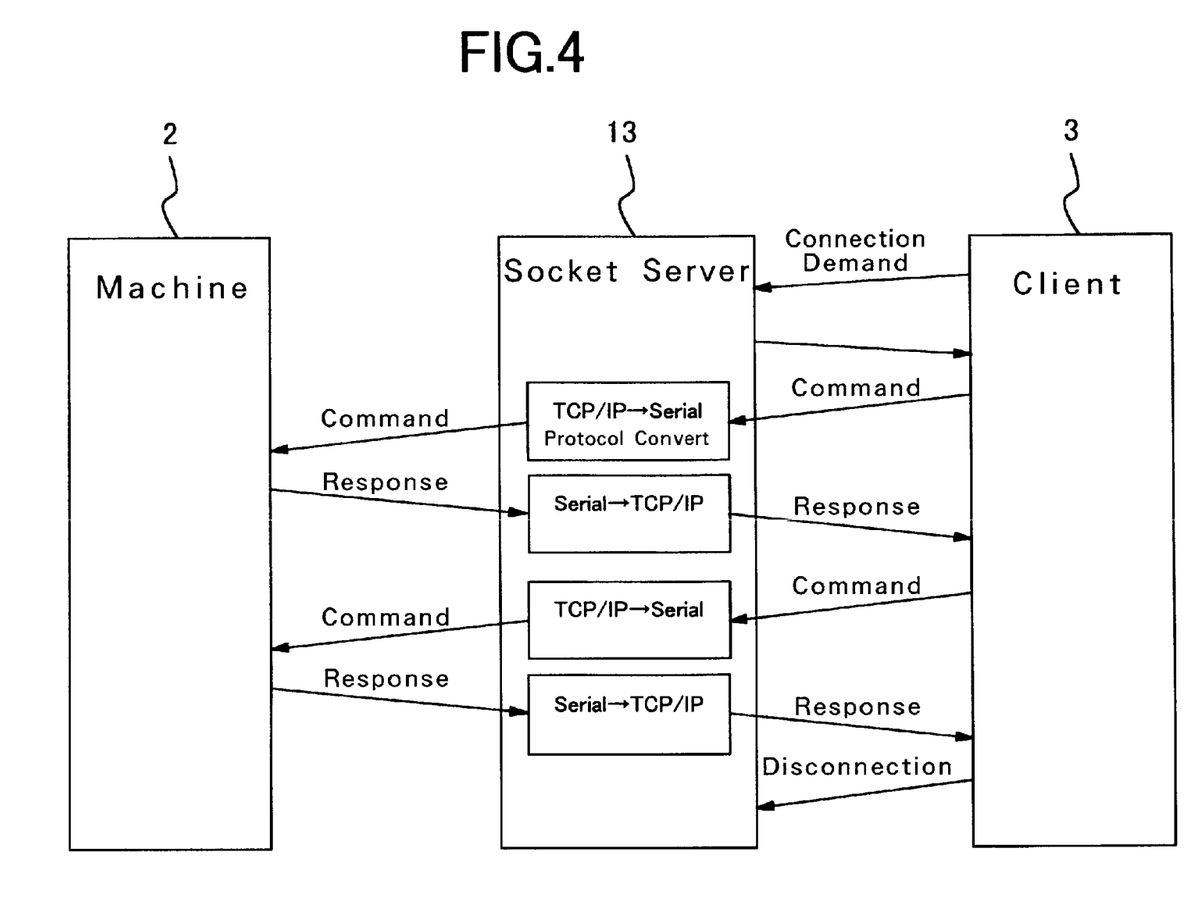
FIG. 4 is a representation of a function of the socket server.

As shown in FIG. 4, the socket server 13 sends a connection permission (or no permission) in response to a connection demand from the personal computer 3. After the connection with the personal computer 3 is established, the socket server executes a protocol conversion of a signal that is transmitted or received between the personal computer 3 and the object machine 2. In other words, the socket server 13 executes the protocol conversion to convert TCP/IP into serial form every time it receives a command from the personal computer 3, and sends a command converted into serial form to the object machine 2. Then, the socket server 13 executes the protocol conversion to convert the serial signal into TCP/IP for a response sent from the object machine 2 according to the command, and sends the response converted into TCP/IP form to the personal computer 3. When the disconnection demand is sent from the personal computer 3, the socket server 13 executes a disconnection.

As to the socket server as mentioned above, a "TCP socket" or a "UDP (User Datagram Protocol) socket" can be used. Further, the following application protocols can be incorporated on the TCP socket or the UDP socket.

"TCP application protocol" such as HTTP, FTP, TELNET and RLOGIN; and

"UDP application protocol" such as TFTP

According to the above-mentioned arrangement, the invention carries out the communication method as follows: In FIG. 1, a method for communicating between the communication object machine 2 and the personal computer 3 includes the first step of connecting the personal computer 3 to the WWW server 14 by the internet browser as a client program stored in the personal computer 3; the second step of obtaining an application program that works on the internet browser via the telecommunication line 20 from the WWW server 14; the third step of establishing a connection between the personal computer 3 and the object machine 1 by executing the application program on the personal computer 3; and the fourth step of communicating between the personal computer 3 and the object machine 1 according to the application program.

Figure 5:
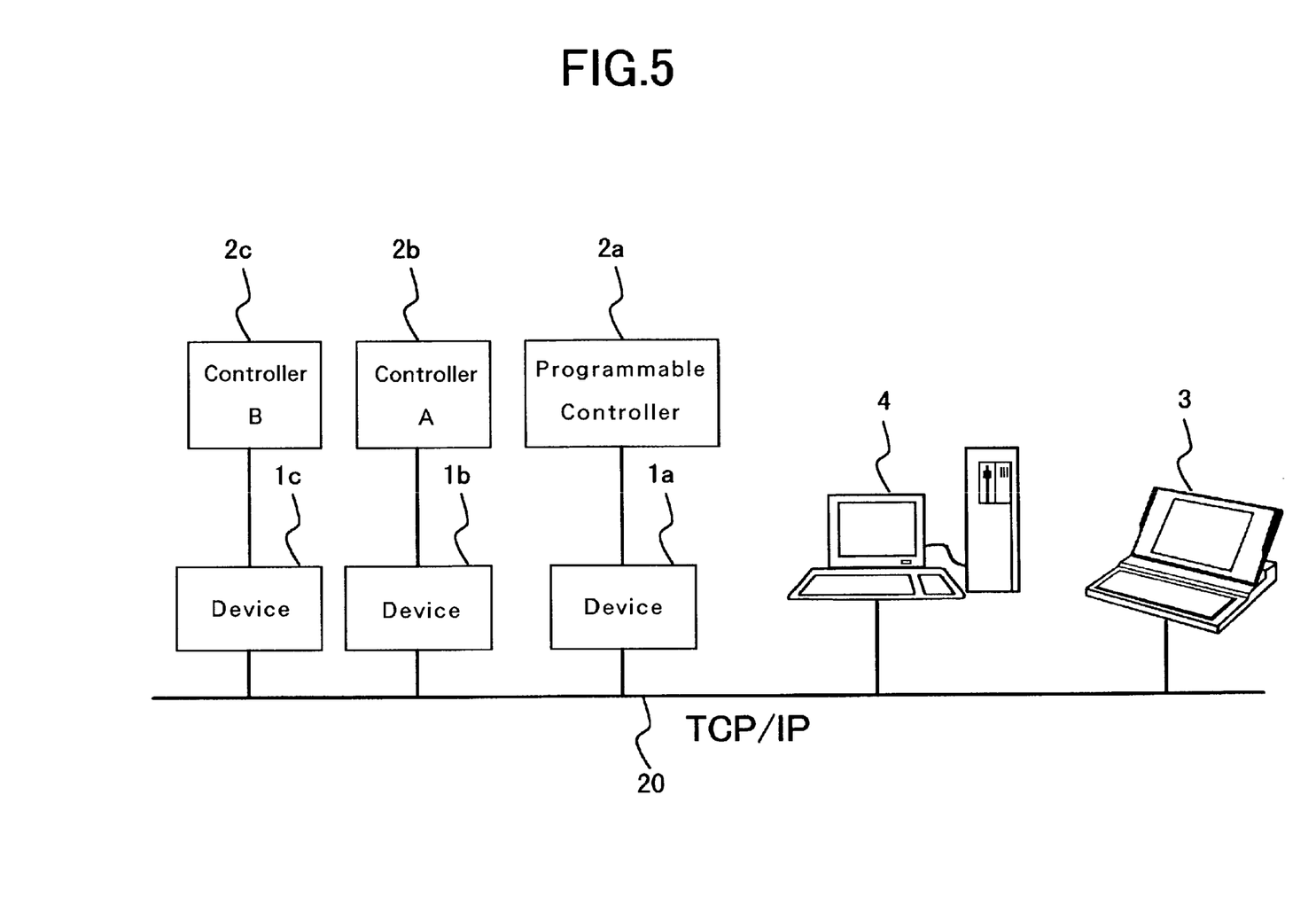
FIG. 5 is a representation of the constitution when the invention is applied for a system which includes plural number of the object machines.

FIG. 5 shows an arrangement wherein the invention is applied in a system that includes a plurality of the object machines. Such a system is useful not only in a process, but also in the fields of FA (factory automation) and BA (building automation).

In FIG. 5, a plurality of object machines 2a, 2b, 2c, - - - are connected to interface devices 1a, 1b, 1c, - - - of the invention, respectively. Each of the object machines is arranged to communicate with the personal computer 3 as the management device which stores the client program (browser) via the telecommunication line 20 to which the devices are connected. In this case, the communication object machine 2a is a programmable controller, the object machine 2b is a controller A, and the object machine 2c is a controller B. The WWW server 4, which consists of a computer having documents for monitoring a system including the object machines 2a,2b,2c, - - - , is connected to the telecommunication line 20.

In operation, when the personal computer 3 is connected with the WWW server 4 via the telecommunication line 20 and demands the document for concentrated monitoring in which the location of each JAVA applet to be arranged on a screen of display is described, the WWW server 4 transmits the document to the personal computer 3.

The browser of the personal computer 3 demands the JAVA applet to the device 1a connected to the controller 2a,according to a description of the document for concentrated monitoring. As the device 1a transmits the demanded JAVA applet to the personal computer 3, it is correspondingly possible to execute the JAVA applet on the display screen of the personal computer 3. Thus, the concentrated monitor can be realized at a controller in a distributed system, such as process control system.

Figure 6:
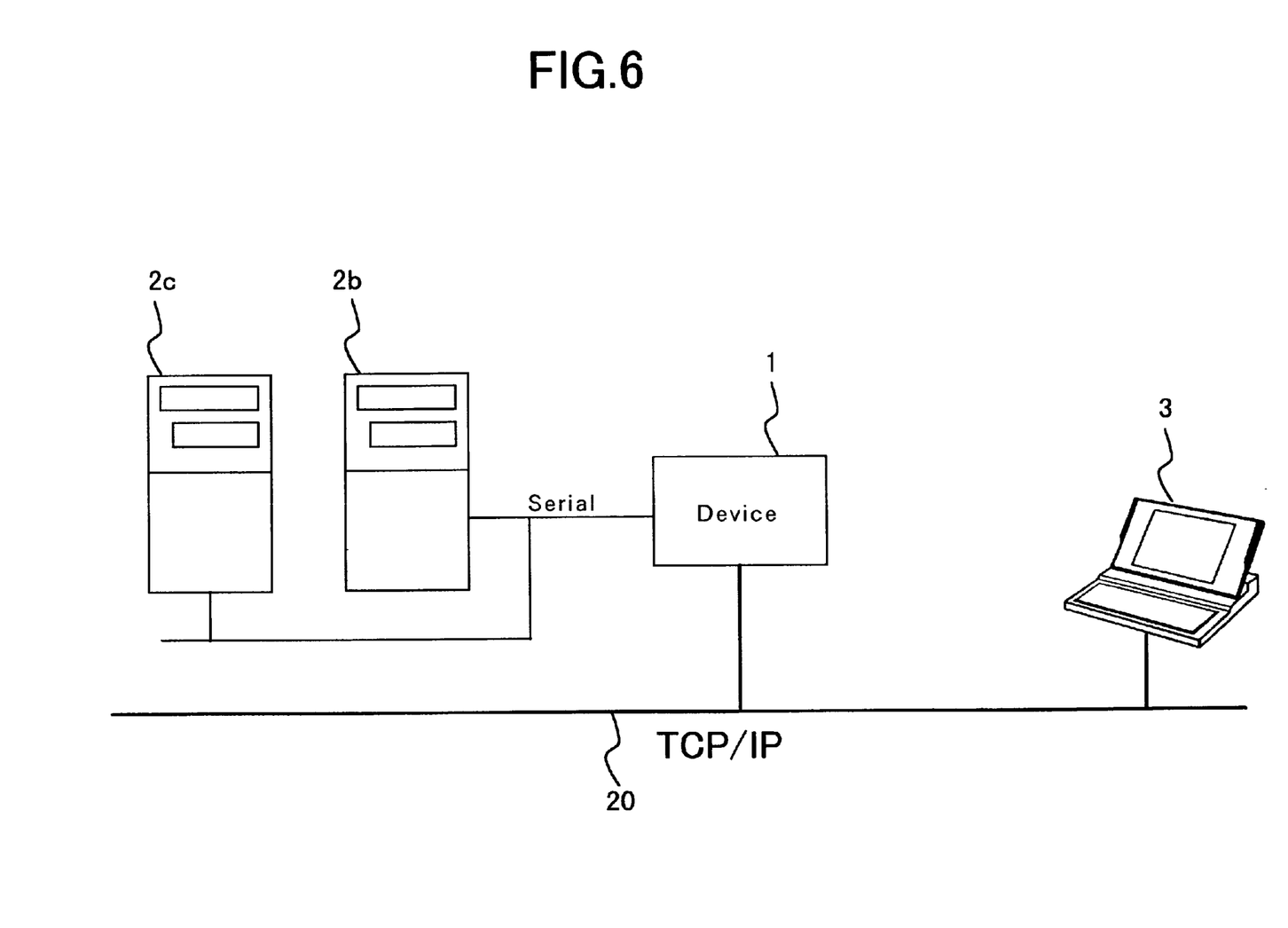
FIG. 6 is a representation of an embodiment wherein one device of the invention is connected to a plurality of object machines.

In FIG. 5, devices 1a, 1b, 1c are connected to communication object machines 2a, 2b, 2c,respectively. However, in an embodiment of the invention where the communication object machines operate using the same communication protocol as controllers 2b and 2c,as shown in FIG. 6, the object machines 2b, 2c can be connected to a single device 1. In this case, each of the object machines 2b, 2c would communicate serially with the device 1. Accordingly, each object machine can be controlled or monitored directly from the personal computer 3.

In FIG. 6, the device 1 stores "document for setting controller", "document for monitoring temperature of controller", "document for monitoring graph of controller", and the like as HTML documents. The device 1 also stores "JAVA applet for communication", "JAVA applet for setting", "JAVA applet for display", and the like as JAVA applets. Since the device 1 transmits the HTML document or JAVA applet demanded to the personal computer 3 in response to a demand from the browser of the personal computer 3 via the telecommunication line 20, it is possible to set parameters of the controller or to monitor measurement data in real-time on the display screen of the personal computer 3.

Though the embodiments of the invention are explained above, this invention is not limited to such embodiments but can be changed from the specific arrangements mentioned above. For example, the interface device according to this invention is provided as a unit separated from the object machine. However, when the communication object machine itself has the processing device (CPU) which can effect intelligent functionally in addition to communication with the outside, the object machine (for example, controller shown in FIG.5) may include means to achieve the above mentioned interface facility (hardware and software for constituting interface device 1 as shown in the block diagram of FIG. 1). Then, the separate unit can be omitted and the communication object machine can realize the communication method of the invention. Accordingly, it is to be understood that this disclosure herein is not intended to be limiting of the invention.

What is claimed is:

1. A communication interface device for delivering control information to a communication object machine via a communication network connected coupled between the communication object machine and a management device that issues the control information for selectably operating the communication object machine, and for delivering monitoring information to the management device via the communication network, the communication interface device comprising:

a socket server for receiving the control information from the management device in a TCP/IP communications protocol, converting the control information into a serial communications protocol and propagating the control information in serial communications protocol to the communication object machines, and in response to a request for connection from the management device, said socket server communicates the request for connection to the communication object machine using a serial communications protocol, receives the monitoring information in serial communications protocol converts the monitoring information into a TCP/IP communications protocol, and propagates the monitoring information in TCP/IP communications protocol to the management device; and a WWW server coupled to the communication network, there being provided a nonvolatile memory connected to said WWW server, the nonvolatile memory being connected to said WWW server and having stored therein application data corresponding to an application program to be transferred to the management device by said WWW server via the communication network in accordance with a client program stored in the management device for execution on the client program;

wherein the request for connection by the management device to the communication object machine is responsive to the application data.

2. The communication interface device of claim 1, wherein the client program is an internet browser.

3. The communication interface device of claim 2, wherein the memory stores HTML document or other information in addition to the application program.

4. The communication interface device of claim 2, wherein the signal conversion performed by said socket server employs bidirectional conversion of a communication protocol effective between the machine and the communication network and a communication protocol effective between the socket server and the communication network.

5. The communication interface device of claim 1, wherein the application program is a general-purpose program name JAVA applet.

6. The communication interface device of claim 3, wherein the memory stores HTML document or other information in addition to the application program.

7. The communication interface device of claim 3, wherein the signal conversion performed by said socket server employs bidirectional conversion of a communication protocol effective between the machine and the communication network and a communication protocol effective between the socket server and the communication network.

8. The communication interface device of claim 1, wherein the memory stores HTML document or other information in addition to the application program.

9. The communication interface device of claim 8, wherein the signal conversion performed by said socket server employs bidirectional conversion of a communication protocol effective between the machine and the communication network and a communication protocol effective between the socket server and the communication network.

10. The communication interface device of claim 1, wherein the signal conversion performed by said socket server employs bidirectional conversion of a communication protocol effective between the machine and the communication network and a communication protocol effective between the socket server and the communication network.

11. The communication interface device of claim 1, wherein a TCP socket or a UDP socket is used for the socket server, and a TCP application protocol or a UDP application protocol is incorporated on the TCP socket or the UDP socket.

12. A communication object machine having a function to communicate with a management device via a communication network, the management device selectably operating and monitoring the action of the communication object machine, the communication object machine comprising:

a socket server for receiving control information from the management device in a TCP/IP communications protocol and converting corresponding control information signals bidirectionally into a serial communications protocol between the communication object machine and the communication network responding to a request for connection from the management device, said socket server communicates the request for connection to the communication object machine using a serial communications protocol, and to the communication network using a TCP/IP communications protocol;

a WWW server coupled to the communication network; and a nonvolatile memory connected to the WWW server;

wherein the memory stores an application program to be transferred to the management device via the communication network according to a client program prepared in the management device and to be executed on the client program.

13. A communication method for communicating between a communication object machine and a management device via a communication network connected between the communication object machine and the management device for selectably operating the communication object machine and monitoring the action of the communication object machine, the communication method comprising the steps of:

connecting the management device to a WWW server according to a client program, such as an internet browser, stored in the management device, said step of connecting being responsive to a request for connection from the management device transmitted in a TCP/IP communications protocol;

executing an application program on the client program via the communication network from the WWW server, the application program being responsive to a client program in the management device;

establishing connection of the management device to the communication object machine by executing the application program on the management device; and communicating bidirectionally between the management device and the communication object machine according to the application program in response to the request for connection from the management device, said step of communicating further including the step of employing a serial communication protocol to communicate with the communication object machine over a portion of the communication network.

* * * * *